(12) United States Patent
Shibazaki

(10) Patent No.: US 8,228,476 B2
(45) Date of Patent: Jul. 24, 2012

(54) HORIZONTAL ELECTRIC FIELD TYPE LIQUID CRYSTAL DISPLAY DEVICE

(75) Inventor: Minoru Shibazaki, Kobe (JP)

(73) Assignee: Chimei Innolux Corporation, Chu-Nan (TW)

( * ) Notice: Subject to any disclaimer, the term of this patent is extended or adjusted under 35 U.S.C. 154(b) by 348 days.

(21) Appl. No.: 12/606,066

(22) Filed: Oct. 26, 2009

(65) Prior Publication Data

US 2010/0103336 A1    Apr. 29, 2010

(30) Foreign Application Priority Data

Oct. 29, 2008    (JP) ................... 2008-277836

(51) Int. Cl.
*G02F 1/1343*    (2006.01)
(52) U.S. Cl. ........................................ 349/141
(58) Field of Classification Search .......... 349/141
See application file for complete search history.

(56) References Cited

U.S. PATENT DOCUMENTS 5,926,244 A * 7/1999 Takeda et al. ............ 349/139

FOREIGN PATENT DOCUMENTS

| CN | 1991461 | 7/2007 |
| JP | 2007-503603 | 2/2007 |

* cited by examiner

*Primary Examiner* — James Dudek
(74) *Attorney, Agent, or Firm* — Liu & Liu

(57) ABSTRACT

The invention discloses a horizontal electric field type liquid crystal display device having a plurality of pixels. Each pixel includes first and second electrodes disposed correspondingly on upper and lower surfaces of the substrate so as to change the orientation of liquid crystal molecules in the plane parallel to the substrate. Each pixel has a third electrode opposite the substrate. A liquid crystal layer containing liquid crystal molecules is sandwiched between the substrate and the third electrode. The first electrode and the third electrode can generate an electric field in the direction perpendicular to the substrate in the liquid crystal layer.

17 Claims, 4 Drawing Sheets

HORIZONTAL ELECTRIC FIELD TYPE LIQUID CRYSTAL DISPLAY DEVICE

FIELD OF THE INVENTION

This invention relates to a horizontal electric field type liquid crystal display device, and more particularly relates to a liquid crystal display device having a plurality of pixels. Each pixel includes a first electrode and a second electrode respectively disposed on upper and lower surfaces of a substrate so as to change the orientation of liquid crystal molecules within a plane parallel to the substrate.

BACKGROUND OF THE INVENTION

For a display device (specifically, a liquid crystal display device), a wider field of view is usually desirable such that users can view the contents therefrom at various angles. For a personal mobile apparatus, e.g. a mobile phone, personal digital assistant, however, there exits a need to keep others from viewing the contents therefrom due to privacy concerns. In view of this, a liquid crystal display device capable of adjusting effective display viewing field has been continuously developed.

The simplest way to alter the effective display viewing field is, for example, utilization of a polarizing film in a display part of the liquid crystal display device. Another method that electronically adjusts the effective display viewing field according to variation of the gamma characteristic in a vertical electric field type liquid crystal display device of vertical alignment mode, twisted nematic mode or electrically controlled birefringence mode is also proposed. Alternatively, in Japanese patent no. 2007-503603, disclosed is a display device having a pair of panels for controlling the viewing field.

In a horizontal electric field type liquid crystal display device of in-plane switching mode or fringe field switching mode, because the gamma characteristic (γ) remains at an ideal value of 2.2, it cannot electronically adjust the effective display viewing field according to variation of the gamma characteristic.

SUMMARY OF THE INVENTION

One embodiment according to the invention discloses a horizontal electric field type liquid crystal display device that is capable of altering the effective display viewing field.

The horizontal electric field type liquid crystal display device has a plurality of pixels. Each pixel includes a first electrode and a second electrode respectively on a upper surface and a lower surface of a substrate, the first electrode corresponding to the second electrode so as to change the orientation of liquid crystal molecules within a plane parallel to the substrate. Each pixel has a third electrode opposite the substrate. A liquid crystal layer containing liquid crystal molecules is sandwiched between the substrate and the third electrode. The first electrode and the third electrode can generate an electric field having a direction along a plane perpendicular to the substrate in the liquid crystal layer.

As such, with the structure capable of generating the electric field perpendicular to the substrate, the orientation of liquid crystal molecules can be changed in a perpendicular as well as in a parallel direction when altering the effective display viewing field. Changing the orientation of liquid crystal molecules in the perpendicular direction worsens the viewing field characteristics, therefore narrowing the effective display viewing field.

The objects and the features according to the present invention may best be understood by reference to the detailed description.

DETAILED DESCRIPTION OF THE INVENTION

Figure 1:
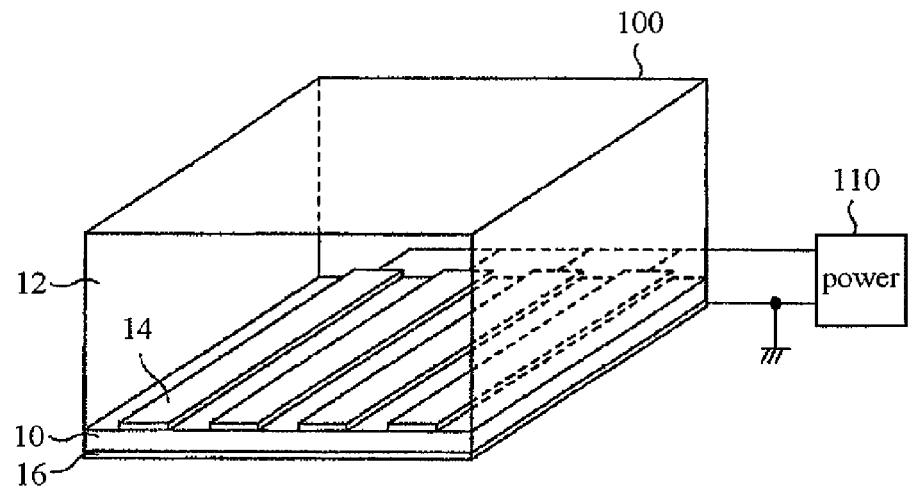
FIG. 1 is a pixel structure of a conventional horizontal electric field type liquid crystal display device.

The preferred embodiments of the present invention will now be described in greater details by referring to the drawings that accompany the present application. It should be noted that the features illustrated in the drawings are not necessarily drawn to scale. Descriptions of well-known components, materials, and process techniques are omitted so as to not unnecessarily obscure the embodiments of the invention. Any devices, components, materials, and steps described in the embodiments are only for illustration and not intended to limit the scope of the present invention.

FIG. 1 is a pixel structure of a conventional horizontal electric field type liquid crystal display device.

As shown in FIG. 1, a pixel 100 includes a substrate 10, a liquid crystal layer 12, pixel electrodes 14, and a common electrode 16. Multiple pixel electrodes 14, each having a certain width, parallel each other at a regular interval on the substrate 10. The common electrode 16 covers a lower surface of the substrate 10. The liquid crystal layer 12 is disposed above the substrate 10 and the pixel electrodes 14. In one embodiment of the invention, a liquid crystal display device includes multiple pixels with such a structure that are disposed in matrix array.

The substrate 10 can be a glass substrate, transparent plastic substrate, or transparent thin film.

The pixel electrodes 14 or the common electrode 16 can be a metal electrode or transparent electrode, e.g. indium-tin-oxide (ITO) electrode.

The pixel electrodes 14 and the common electrode 16 are electrically coupled to the power 110. An electric potential difference occurs between the pixel electrodes 14 and the common electrode 16 when turning the power 110 on. Due to the electric potential difference, a horizontal electric field having a direction parallel to the substrate 10 is generated in the liquid crystal layer 12. The liquid crystal molecules (not shown) of the liquid crystal layer 12 change their orientation within a plane parallel to the substrate 10 when the horizontal electric field is presented. That is, liquid crystal molecules deviate from a surface of the substrate 10 at an angle of zero degrees.

The common electrode 16 is electrically coupled to a reference electric potential or ground. A voltage supplied from the power 110 to the pixel electrode 14 generally ranges between 0 and 4.5 volts when the electric potential of the common electrode 16 serves as a reference. When the voltage value changes, magnitude of the horizontal electric field generated in the liquid crystal layer 12 also changes, therefore altering the orientation of liquid crystal molecules.

Figure 2:
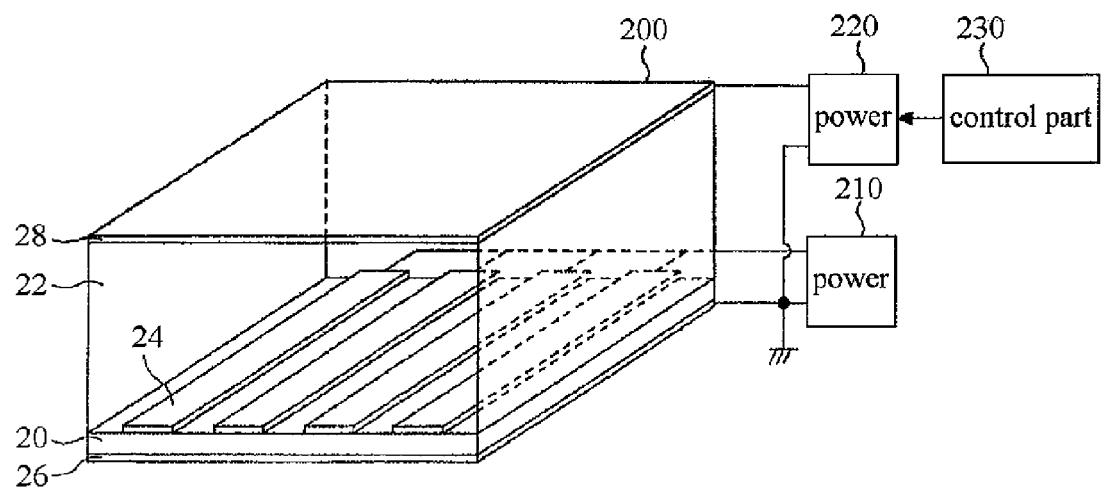
FIG. 2 is a pixel structure of a horizontal electric field type liquid crystal display device in accordance with a first embodiment of the present invention.

FIG. 2 is a pixel structure of a horizontal electric field type liquid crystal display device in accordance with a first embodiment of the present invention.

The pixel 200 shown in FIG. 2 includes a viewing angle adjusting electrode 28 as well as a substrate 20, liquid crystal layer 22, pixel electrodes 24, and common electrode 26. The viewing angle adjusting electrode 28 and the substrate 20 are arranged to oppose to each other and sandwich the liquid crystal layer 22. The viewing angle adjusting electrode 28, for example, can be a transparent electrode made of indium tin oxide.

The pixel electrode 24 and the common electrode 26 are electrically coupled to a first power 210. An electric potential difference is generated between the pixel electrode 24 and the common electrode 26 when turning the power 210 on. Due to the electric potential difference, a horizontal electric field is generated in the liquid crystal layer 22. Accordingly, the orientation of liquid crystal molecules (not shown) in the liquid crystal layer 22 can change within a plane parallel to the substrate 20.

The viewing angle adjusting electrode 28 is electrically coupled to a second power 220. A voltage supplied from the second power 220 to the viewing angle adjusting electrode 28 is controlled by a control part 230. The control part 230 receives signals that are input from users for requesting adjustment of viewing angle, and then turns the second power 220 on. When the second power 220 stays off, i.e. in the normal display mode, the viewing angle adjusting electrode 28 has a floating electric potential. Also, the control part 230 can change the voltage supplied to the second power 220 so as to make the electric potential difference between the viewing angle adjusting electrode 28 and the pixel electrode 24 exceed 3 volts. As described above, with the electric potential of the common electrode 26 serving as a reference, a voltage supplied from the power 210 to the pixel electrode 24 generally ranges between 0 and 4.5 volts. In this case, with the electric potential of the common electrode 26 serving as a reference, the voltage supplied from the second power 220 to the viewing angle adjusting electrode 28 has a value ranging from at least 3 to 7.5 volts. In another embodiment, the pixel electrode 24 and the common electrode 26 may be arranged in a reverse manner. In this case, because the common electrode 26 is electrically coupled to a reference electric potential or ground, there is no need to change the voltage supplied to the viewing angle adjusting electrode 28 as long as it remains at a value of 3 volts or above relative to the electric potential of the common electrode 26.

The electric potential difference between the viewing angle adjusting electrode 28 and the pixel electrode 24 or the common electrode 26 leads to that an electric field (e.g. a perpendicular electric field) having the direction perpendicular to the substrate 20 is generated in the liquid crystal layer 22. When the perpendicular electric field is presented, the orientation of liquid crystal molecules (not shown) in the liquid crystal layer 22 inclines from the substrate 20.

In general, the transparency T of the horizontal electric field type liquid crystal display device is expressed as the following formula:

$$T=sin^2(\Delta nd/\lambda \cdot \pi) \cdot sin^2(2\psi)$$

wherein, $\Delta nd$ indicates the status of the orientation of liquid crystal molecules (i.e. the so-called retardation), and is expressed as the following formula:

$$\Delta nd=(n_e-n_o) \cdot d$$

$n_e$ represents a refractive index parallel to a long axis of the liquid crystal molecule; $n_e$ represents a refractive index perpendicular to a short axis of the liquid crystal molecule; and d represents thickness of the liquid crystal layer. $\psi$ is an angle between the director of the liquid crystal and an absorption axis (or transmittance axis) of the polarizing plate. When a black mode is displayed, the angle $\psi$ is 0 or 90 degrees.

Figure 3:
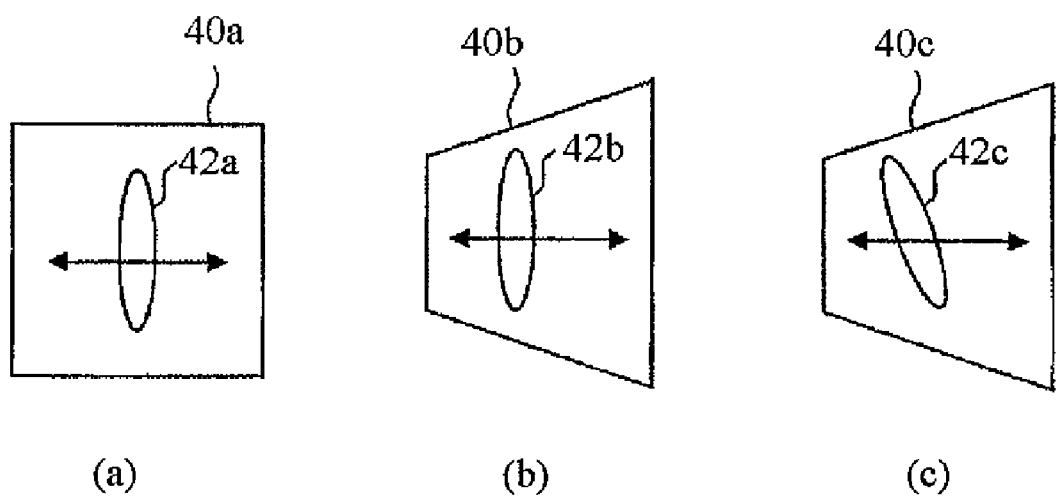
FIG. 3 illustrates viewing angle characteristics of a general horizontal electric field type liquid crystal display device.

FIG. 3 illustrates viewing angle characteristics of a general horizontal electric field type liquid crystal display device.

FIG. 3(a) shows a related arrangement between liquid crystal molecules 42a and the polarizing plate when watching the liquid crystal display device 40a in a front view. In this case, as being aware from the figure, the angle $\psi$ is 0 or 90 degrees. FIG. 3(b) shows a related arrangement between the polarizing plate and liquid crystal molecules 42b oriented in parallel with the substrate when watching the liquid crystal display device 40b in an oblique view. In this case, either in a oblique view or in a front view, it exhibits good viewing angle characteristics due to no substantial changes of the related arrangement between the polarizing plate and liquid crystal molecules 42b watching. However, when liquid crystal molecules are oriented at a pretilt angle deviating from the substrate, it can be seen from FIG. 3(c) that, in an oblique view, the viewing angle characteristics worsen because the related arrangement changes, and the gamma characteristic departs from the ideal value although the angle $\psi$ is 0 or 90 degrees in a front view. In other words, the effective display viewing angle becomes narrow.

Hereinafter, reasons for setting an electric potential difference between the viewing angle adjusting electrode 28 and the pixel electrode 24 or the common electrode 26 to be larger than 3 volts are provided.

Figure 4:
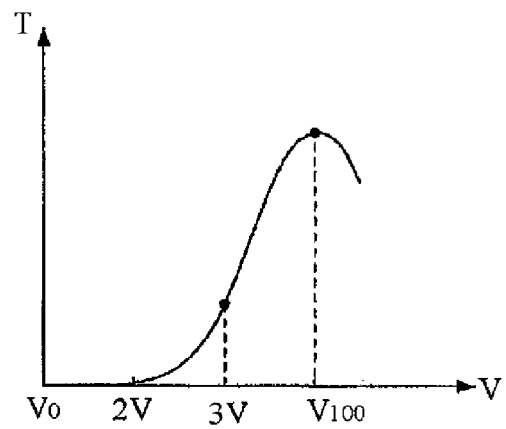
FIG. 4 is a diagram showing the relationship between transparency T and a voltage V applied in the direction perpendicular to a liquid crystal layer.

FIG. 4 is a diagram showing the relationship between transparency T and a voltage V applied in the direction perpendicular to a liquid crystal layer. As to a structure in which the liquid crystal layer is sandwiched between mutually parallel polarizing plates, an angle between liquid crystal molecules and the polarizing plates is set at 45 degrees. A threshold voltage that makes liquid crystal molecules begin to incline against the substrate is about 2 volts. The transparency T increases as the liquid crystal molecules continuously rotate and is perpendicular to the substrate. The transparency T goes up to the maximum value when the applied voltage is between 4.5 and 5 volts. It inversely decreases as the applied voltage is further increased. $\theta_{V100}$ represents the inclination angle of liquid crystal molecules as the transparency T reaches the maximum value. $\theta_{V0}$ (in the proximity of zero degrees) represents the inclination angle of liquid crystal molecules as the transparency T reaches the minimum value, i.e. 0.

The applied voltage V for generating the effective display viewing angle is larger than the voltage value capable of generating the inclination $\theta_{max}$ of liquid crystal molecules. $\theta_{max}$ can be calculated by the following formula:

$$\theta_{max}(\theta_{V100}+\theta_{V0})/2$$

In general, the inclination $\theta_{max}$ of liquid crystal molecules occurs when the applied voltage reaches about 3 volts. Therefore, the electric potential difference between the viewing angle adjusting electrode 28 and the pixel electrode 24 or the common electrode 26 is set larger than 3 volts. In addition, as applying the voltage ranged between 4.5~5.5 volts can reach the maximum of transparency T, there is no need to supply an electric potential difference exceeding 5 volts.

Figure 5:
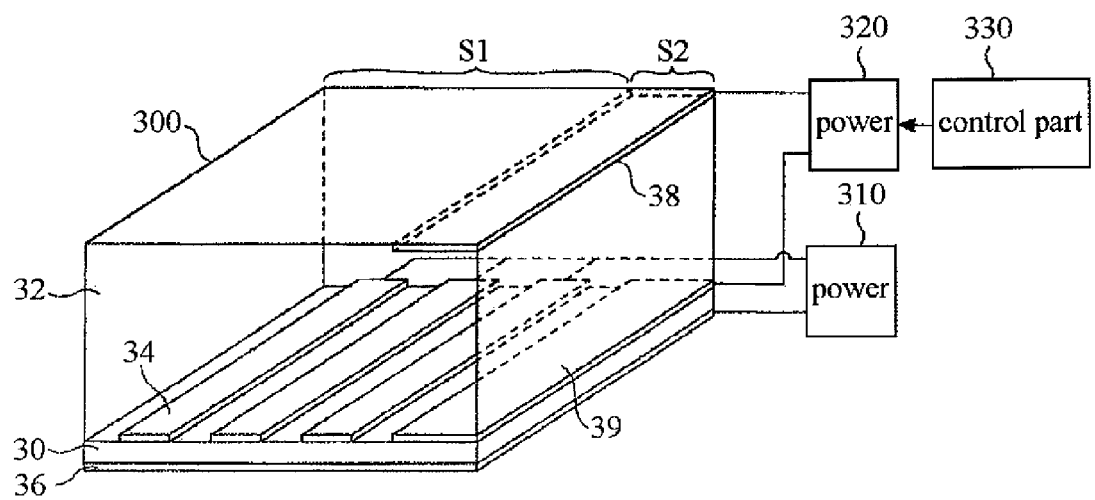
FIG. 5 is a pixel structure of a horizontal electric field type liquid crystal display device in accordance with a second embodiment of the present invention.

FIG. 5 is a pixel structure of a horizontal electric field type liquid crystal display device in accordance with a second embodiment of the present invention.

A pixel 300 shown in FIG. 5 includes a first sub-pixel S1 and a second sub-pixel S2. The first sub-pixel S1 is used for normal display while the second sub-pixel S2 is used for adjusting the viewing angle only.

The first sub-pixel S1 and the second sub-pixel S2 share a substrate 30, a liquid crystal layer 32, and a common electrode 36. The first sub-pixel S1 further includes pixel electrodes 34 having a certain width that are parallel to each other at a regular interval on the substrate 30. The second sub-pixel S2 further includes a first viewing angle adjusting electrode 38 and a second viewing angle adjusting electrode 39. The first viewing angle adjusting electrode 38 and the substrate 30 are opposed to each other, sandwiching the liquid crystal layer 32. The second viewing angle adjusting electrode 39 is disposed on the substrate 30. The first and second viewing angle adjusting electrodes 38, 39 can employ, for example, a transparent ITO electrode.

Similar to the pixel 100 shown in FIG. 1, the pixel electrodes 34 and the common electrode 36 are electrically coupled to the first power 310. An electric potential difference is generated between the pixel electrodes 34 and the common electrode 36 when turning the first power 310 on. The electric potential difference leads to generation of a horizontal electric field in the liquid crystal layer 32. As a result, the orientation of liquid crystal molecules (not shown) of the liquid crystal layer 32 is changed in the plane parallel to the substrate.

The first and second viewing angle adjusting electrodes 38, 39 are electrically coupled to the second power 320. A voltage supplied from the second power 320 to the first viewing angle adjusting electrode 38 is controlled by a control part 330. The control part 330 can receive signals from users for requesting adjustment of viewing angle, thereby turning the second power 320 on. The control part 330 also can change the supplied voltage from the second power 320 so as to make the electric potential difference between the first and second viewing angle adjusting electrodes 38, 39 exceed 3 volts. The electric potential difference leads to generation of a perpendicular electric field in the liquid crystal layer 32. As a result, liquid crystal molecules (not shown) of the liquid crystal layer 32 incline from the substrate 30 due to such the perpendicular electric field. As described, the transparency of the liquid crystal layer changes depending on the inclination of liquid crystal molecules against the substrate. Therefore, the gamma characteristic of the second sub-pixel S2 departs from the ideal value.

Because of combination of the first sub-pixel S1 having a nearly ideal gamma characteristic and the second sub-pixel S2 having a gamma characteristic varying with different viewing angles, the viewing angle characteristics of the pixel 300 worsen and the effective display viewing angle becomes narrow.

Compared to the pixel structure of the first embodiment shown in FIG. 2, the first sub-pixel S1 in the pixel structure of the second embodiment shown in FIG. 5 remains at a nearly ideal gamma characteristic when changing the viewing angle. Thus, the contrast of an image displayed in the display device can be maintained. On the other hand, the aperture ratio of the pixel is decreased in order to provide an suitable area to place the second sub-pixel S2 used for changing the effective display viewing angle. However, when arranging the pixels in a matrix array, a more flexible arrangement is to place the second sub-pixel S2 on a dead corner between the pixels, therefore increasing the area of the first sub-pixel S1 and the aperture ratio of the pixel.

Figure 6:
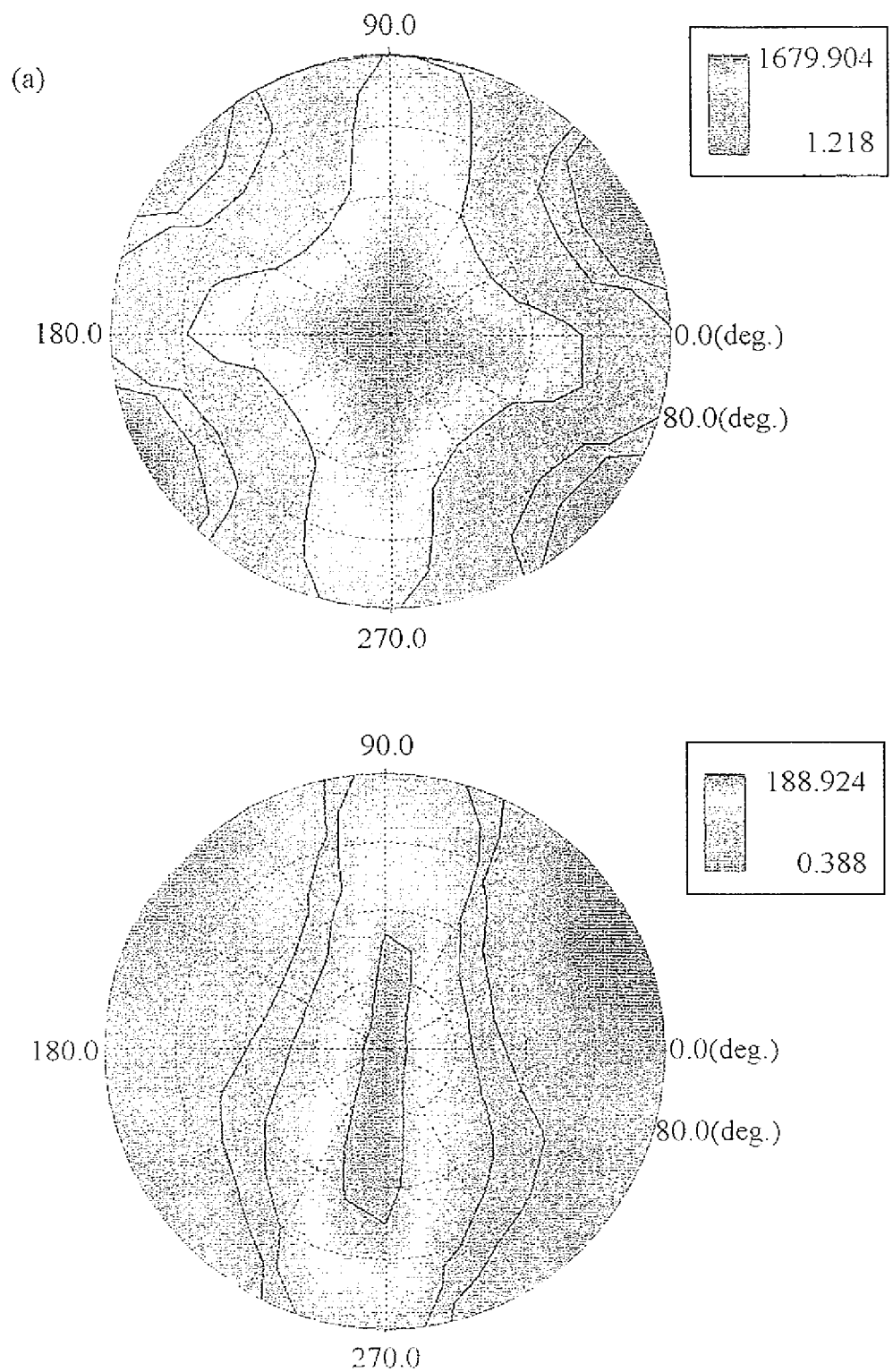
FIG. 6 is a diagram showing the effective display viewing angle in accordance with embodiments of the present invention.

FIG. 6 includes graphs showing the effective display viewing angles in accordance with embodiments of the present invention. FIG. 6(a) shows the effective display viewing angle in the normal display mode; and FIG. 6(b) shows the effective display viewing angle when changing the viewing angle. As shown in FIG. 6, compared to the normal display mode, the left/right viewing angles become narrow when changing the viewing angle. Accordingly, no one can easily watch the display contents except users facing the display device.

The invention also can be utilized in either passive or active liquid crystal display device.

Although specific embodiments have been illustrated and described, it will be obvious to those skilled in the art that various modifications may be made without departing from what is intended to limited solely by the appended claims.

For example, although the second embodiment of the invention discloses a pixel consisting of two sub-pixels as shown in FIG. 5, a pixel including more sub-pixels may be employed in alternative embodiments as long as at least one sub-pixel is capable of changing the viewing angle. In doing so, the aforementioned advantageous effects of the invention also can be achieved.

Furthermore, alternative embodiments may drive a portion of the viewing angle adjusting electrodes only, instead of driving all of them simultaneously. In dosing so, a pattern is displayed when others who are not users watch the display device at an inclined angle. The displayed pattern can prevent them from watching the display contents easily.

The invention claimed is:

1. A horizontal electric field type liquid crystal display device, comprising a plurality of pixels, each pixel including a first electrode and a second electrode on a substrate, the first electrode corresponding to the second electrode so as to generate an electric field having a direction parallel to the substrate and change orientation of liquid crystal molecules, the horizontal electric field type liquid crystal display device being characterized in that:
    each pixel comprising:
        a third electrode opposite the substrate, wherein a liquid crystal layer containing liquid crystal molecules is sandwiched between the substrate and the third electrode;
        wherein the first electrode and the third electrode generate an electric field having a direction perpendicular to the substrate in the liquid crystal layer, and
        wherein the first electrode and the second electrode are respectively disposed above and below the substrate so as to change the orientation of liquid crystal molecules within a plane parallel to the substrate.

2. The horizontal electric field type liquid crystal display device of claim 1, wherein each pixel comprises two or more sub-pixels;
    at least one of the two or more sub-pixels comprises the first and second electrodes so as to change the orientation of liquid crystal molecules within a plane parallel to the substrate; and
    at least another one of the two or more sub-pixels comprises the first and third electrodes so as to generate the electric field having the direction perpendicular to the substrate in the liquid crystal layer.

3. The horizontal electric field type liquid crystal display device of claim 1, further comprising:
    a power supplying voltage to the third electrode; and a control part controlling the voltage supplied from the power to the third electrode so as to generate the electric field having the direction perpendicular to the substrate in the liquid crystal layer;

wherein the third electrode is at a floating electric potential except that when the electric field having the direction perpendicular to the substrate in the liquid crystal layer is generated.

4. The horizontal electric field type liquid crystal display device of claim 3, wherein the control part controls the voltage supplied from the power to the third electrode, whereby a voltage difference between the first and third electrodes exceeds three volts.

5. The horizontal electric field type liquid crystal display device of claim 1, wherein the first electrode is a common electrode or pixel electrode.

6. The horizontal electric field type liquid crystal display device of claim 1, wherein the first electrode and the second electrode are disposed on opposite sides of the substrate.

7. A horizontal electric field type liquid crystal display device, comprising:
- a substrate having a first side and a second side opposite the first side;
- a first electrode disposed above the first side of the substrate;
- a liquid crystal layer comprising liquid crystal molecules disposed above the first electrode;
- a second electrode disposed below the second side of the substrate, wherein the first and second electrodes generate a first electric field in the liquid crystal layer having a direction parallel to the substrate; and
- a third electrode, wherein the liquid crystal layer is disposed between the first electrode and the third electrode, and wherein the first and third electrodes generate a second electric field in the liquid crystal layer having a direction perpendicular to the substrate.

8. The horizontal electric field type liquid crystal display devices of claim 7, wherein the first electric field changes orientation of the liquid crystal molecules in the liquid crystal layer.

9. The horizontal electric field type liquid crystal display devices of claim 8, wherein the first electric field changes the orientation of liquid crystal molecules within a plane parallel to the substrate.

10. The horizontal electric field type liquid crystal display devices of claim 9, wherein the first, second and third electrodes define a plurality of pixels.

11. The horizontal electric field type liquid crystal display devices of claim 10, wherein each pixel comprises at least first and second sub-pixels, and wherein the first and second electrodes change the orientation of liquid crystal molecules within the plane parallel to the substrate in the first sub-pixel, and the first and third electrodes generate the second electric field in the second sub-pixel.

12. The horizontal electric field type liquid crystal display device of claim 11, further comprising:
- a power supplying a voltage to the third electrode; and
- a control part controlling the voltage supplied from the power to the third electrode so as to generate the second electric field, wherein the third electrode is at a floating electric potential except when the second electric field having the direction perpendicular to the substrate in the liquid crystal layer is generated.

13. The horizontal electric field type liquid crystal display device of claim 12, wherein the control part controls the voltage supplied from the power to the third electrode, whereby a voltage difference between the first and third electrodes exceeds three volts.

14. The horizontal electric field type liquid crystal display device of claim 13, wherein the first electrode is a pixel electrode.

15. The horizontal electric field type liquid crystal display device of claim 1, further comprising:
- a power supplying a voltage to the third electrode; and
- a control part controlling the voltage supplied from the power to the third electrode so as to generate the second electric field, wherein the third electrode is at a floating electric potential except when the second electric field having the direction perpendicular to the substrate in the liquid crystal layer is generated.

16. The horizontal electric field type liquid crystal display device of claim 15, wherein the control part controls the voltage supplied from the power to the third electrode, whereby a voltage difference between the first and third electrodes exceeds three volts.

17. The horizontal electric field type liquid crystal display device of claim 16, wherein the first electrode is a pixel electrode.

* * * * *